Patented Jan. 8, 1935

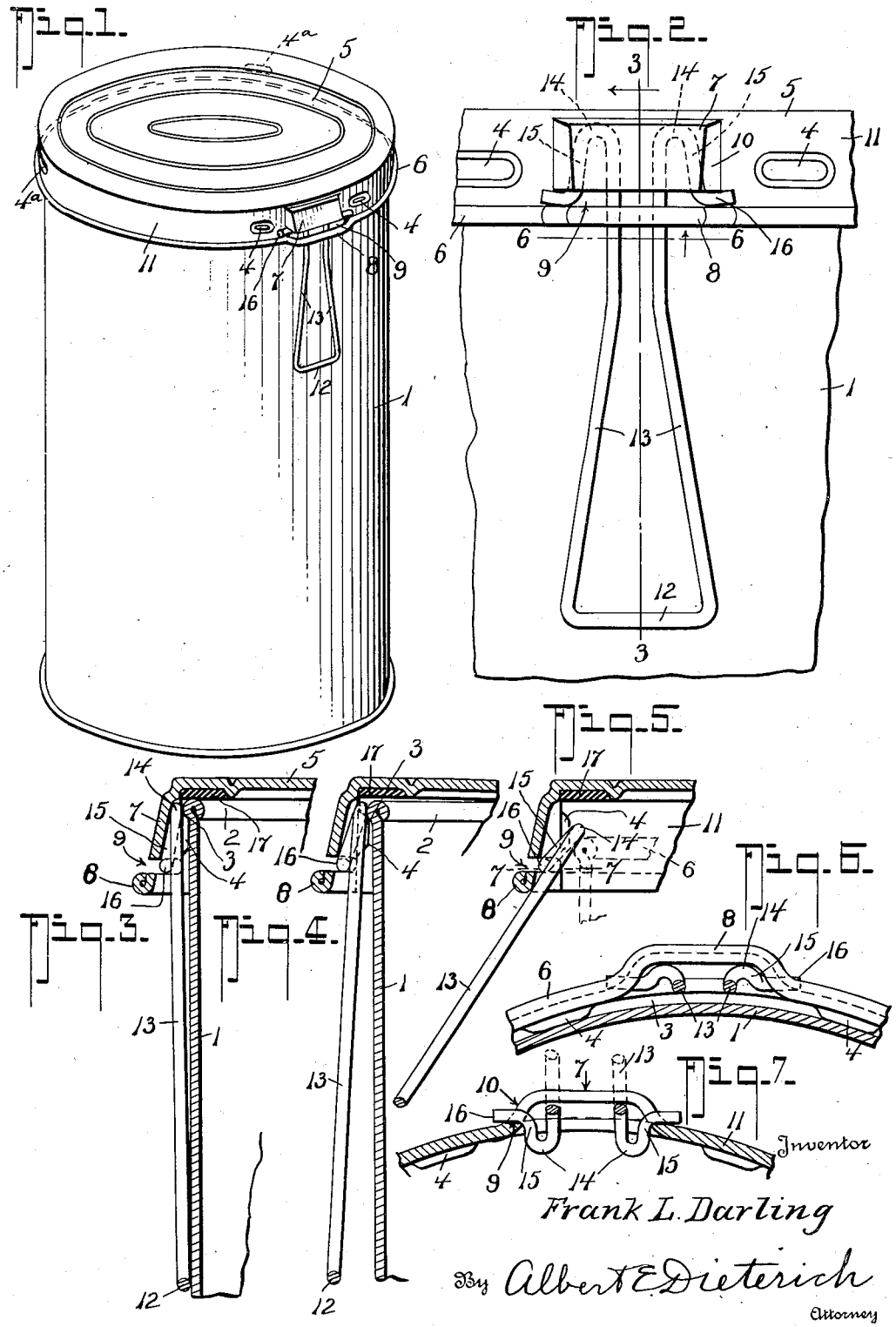

1,987,550

UNITED STATES PATENT OFFICE 1,987,550

COVER AND RECEPTACLE AND MEANS FOR REMOVING THE COVERS FROM THE RECEPTACLES

Frank Lee Darling, Forest Hills, N. Y., assignor to Open E Z Crown Co., Inc., Dover, Del., a corporation of Delaware Application December 20, 1933, Serial No. 703,311

20 Claims. (Cl. 220—43)

This invention relates to certain new and useful improvements in the covers of receptacles and one of its objects is to provide the cover and the receptacle with interlocking means and to provide the cover with means whereby it may be lifted off or removed from the receptacles without destroying the cover or the interlocking means.

Further it is an object to provide a receptacle with a metallic cover, the cover being slipped onto the receptacle as a closure, the cover and the receptacle having interlocking projections to hold the cover on the receptacle, the interlocking means being of such character as properly to function regardless of the position of the cover when placed on the receptacle, and the cover being provided with a releasing device which, while lying in such position on the cover as not to interfere with the capping of the receptacle, will be automatically brought into close contact with the side wall of the receptacle, so as not to project out and interfere with the canning machinery or with other receptacles when the same are packed for shipment, etc.

A further object of the invention is to provide a metallic receptacle having a metallic cover and a cover remover of such character that it will remain removably attached to the cover at all times and yet will not interfere with the air-tight sealing of the receptacle. In other words, it is an object to provide a construction of a receptacle cover and cover remover of such character that once the cover is snapped into place on the receptacle the receptacle will be sealed so tight that a partial vacuum may be set up in the receptacle without leakage of the air between the cover and the receptacle.

Further it is an object to provide a receptacle with a snap-on cover, the same having interlocking means which will hold the two parts engaged, air-tight if desired, and to provide a cover remover which will so act as first to break the vacuum in the receptacle and then to pry off the cover, all without damaging either the receptacle or the cover or the remover.

Further it is an object to provide means in virtue of which the cover remover will be carried at all times by the cover so that the receptacle, the cover and the remover may be used as often as desired.

Further it is an object to provide a receptacle having a smooth uninterrupted mouth edge (preferably beaded) against which a packing ring may be seated with sealing contact, a metallic skirted cap having lugs or nibs in its skirt and having a contacting ring in its top respectively to interlock with the receptacle and still be airtight.

A further object is to provide a cover prying-off lever of a simple, inexpensive construction mounted on the skirt of the cover so as to lie between the skirt and the side wall of the receptacle and to project below the cover alongside of the receptacle and in a manner to be engagable by one's fingers.

Further the invention has for an object to provide for the fulcruming of the cover removing lever on the skirt of the cap near its lower edge and to provide the lever with a short arm that projects to adjacent the bead of the receptacle, the longer arm of the lever projecting below the lower edge of the cover.

Further it is an object to provide for holding the cover remover and lever inclined to the axis of the cover with the long arm extending outwardly, when the cover is off the receptacle so as to prevent the lever from being inserted into the receptacle during the operation of placing the cover on the receptacle.

A still further object is to provide a cover and cover remover for metallic receptacles which will function on almost any receptacle having a shoulder at its mouth edge, regardless of the structure or form of the remainder of the receptacle.

Other objects will in part be obvious and in part be pointed out hereinafter.

To the attainment of the aforesaid objects and ends, the invention still further resides in those novel details of construction, combination and arrangement of parts, all of which will be first fully described in the following description, then be particularly pointed out in the appended claims and illustrated in the accompanying drawing, in which:—

Figure 1 is a perspective view showing one form of receptacle (a can) and cover with my invention applied.

Figure 2 is an enlarged elevation of a portion of the same.

Figure 3 is a vertical section on the line 3—3 of Figure 2.

Figure 4 is a section similar to Figure 3 showing the cover lifter moved outwardly slightly a distance sufficient to break the vacuum within the can.

Figure 5 is a vertical section similar to Figures 3 and 4 showing how the cap lifter lies when the cover is not on the receptacle.

Figure 6 is a horizontal section on the line 6—6 of Figure 2.

Figure 7 is a horizontal section on the line 7—7 of Figure 5.

In the drawing, in which like numerals of reference indicate like parts in all the figures, 1 represents a receptacle, such as a metallic can, for example. The receptacle may be of any desired kind as to its general structure and form, save that it is provided with a bead 2 constituting its mouth edge, the outer diameter of the bead being somewhat greater than that of the body of the receptacle so as to define a shoulder 3 to cooperate with the lugs 4 and 4a on the skirt 11 of the cover or lid 5 and constitute therewith a means for interlocking the receptacle and the cover.

The cover or lid 5 has a bead 6 at the edge of its skirt 11 and it is also provided with a hood-like portion 7 (the bead 6 being offset as at 8 to correspond to the form of the hood in cross section) which is transversely slotted, as at 9. The side walls 10 of the hood 7 preferably taper outwardly for a purpose which will presently appear.

The lid or cover lifter 12, which is a part of my present invention, comprises a wire bent back upon itself to provide a pair of resilient arms 13 which constitute the long arm of a lever. The arms 13 are again bent back upon themselves as at 14, to provide the short arms 15 that terminate in trunnions 16 which lie in the slot 9 and engage the cover or lid skirt 11 at the ends of the slot 9. These arms 15 constitute the short arms of the lever and 16 is its fulcrum.

The short arms 15 are approximately as long as the depth of the skirt 11 above the bead 6 and they lie, together with the bends 14 and adjacent parts of arms 13, within the hood 7 between the cover and the side wall of the receptacle.

It will be observed by reference to Figures 3, 4 and 5, that the arms 15 lie in a plane that is inclined outwardly with respect to that containing the arms 13 and the trunnions 16 are preferably inclined upwardly (see Figure 2) although they may line up with one another, if desired.

By reason of the form of that portion of the lifter 12 which lies within the hood 7, in cooperation with the inclined walls 10 and the resiliency of the lifter arms 13 (which tend to spread apart), when the cap or cover 5 is not on a receptacle (Figure 5) the arms 13 will lie at an inclination to the axis of the cover with the lower end of the lifter 12 farthest from the axis.

The lifter will assume the position shown in Figures 5 and 7 automatically when the lid or cover 5 is not in place on a receptacle. This is caused by the cam action of the lower edges of the walls 10—10 at the slot 9 (see Figure 7) and the spreading action at the trunnion ends of the lifter 12.

When, however, the cover is placed on a receptacle, the bead 2 will engage the inwardly projecting elbows, formed by the portions 14 of the lifter and swing the arms 13 to the position shown in Figures 1, 2 and 3.

As the cover 5 is forced over the mouth of the receptacle 1 the packing ring 17 will be held in sealing contact with the bead 2 by the engagement of the lugs 4 with the shoulders 3.

The gasket 17, together with the means for holding the cover 5 interlocked with the receptacle 1, is sufficient to enable the receptacle to hold a partial vacuum (a negative air pressure) within the receptacle.

In order to open the receptacle, i. e., lift off the cover, one need only lift the lower end of the lifter 12. The first part of the action of lifter 12 (see Figure 4) serves to raise the adjacent part of the cover and gasket sufficiently to release the vacuum, and then upon further movement of the lifter 12 away from the body of the receptacle 1, the elbows 14 will pivot on and slide over the bead 2 and pry the cover off, (see Figure 5).

The structure of the cover and its lifter is such that neither the receptacle, the cover, or the lifter are deformed or injured in use and the cover may be replaced and removed as often as desired.

It should further be noted that with my construction an air-tight seal is obtainable no tying means is necessary to hold the lifter end against the receptacle wall; there are no projections to catch into other articles with which the receptacle may be brought into contact in packing, shipping or on display shelves; and furthermore the continuity of the cover's reinforcing bead 6 is not broken, the bead itself constituting a protector for the lifter on the covered receptacle as well as a stop for the lifter when the cover is removed.

Preferably two lugs 4 are spaced approximately 120° apart and two lugs 4a close to the hood 7, one at either side, the first two mentioned lugs 4 being spaced about 120° from the hood.

As will be seen by reference to Figures 4 and 5, the first part of the movement of lever 12 outwardly and upwardly from the receptacle results in breaking the vacuum, as before stated, and also releases the lugs 4—4, adjacent the hood 7, from the locking shoulder 3; further movement causes the elbows 14 to ride on and over the bead 2, with a curvilinear motion, so that the points of pressure contact between the lever and bead 2 are constantly shifting until the cover is finally removed.

The cover being of a metallic structure has more or less resiliency so that it will "give" at the places between the adjacent lugs 4 when the lifter is working and thus it takes comparatively little force for one to operate the lifter in the removal of the cover from the receptacle.

Further, since my lifter has two elbows spaced apart and engaging the rim bead 2 of the receptacle, and has two relatively widely separated points of contact with the cover (as at 16) the lifting pressures are distributed in such manner that no indenting of cover or receptacle occurs but cover, receptacle and lifter remain in perfect condition at all times.

Other advantages than those herein specifically mentioned will doubtless occur to those skilled in the art, and it is obvious that changes in the form of cover and receptacle (round, square, rectangular, etc.) may be made without departing from the principle of my invention and the scope of the appended claims.

What I claim is:

1. A receptacle, a cover having a skirt fitted over the mouth of the receptacle, means to interlock the cover and receptacle, said cover having a transverse slot and an adjacent offset portion, a cover lifting lever fulcrumed in the slot of the cover and having a short arm projecting upwardly toward the top of the cover within the offset portion and having a long arm projecting below the skirt of the cover to lie in contact at its lower end with the receptacle wall.

2. A receptacle, a cover having a skirt fitted over the mouth of the receptacle, means to interlock the cover and receptacle, said cover having a transverse slot and an adjacent offset portion, a cover lifting lever fulcrumed in the slot of the cover and having a short arm projecting upwardly toward the top of the cover within the offset portion and having a long arm projecting below the skirt of the cover to lie in contact at its lower end with the receptacle wall, the plane containing the long arm of the lever lying at an angle to that containing the short arm and the upper end of the lever being formed to lie against the receptacle wall adjacent the mouth rim and below a transverse plane containing the edge surface of the mouth rim.

3. A receptacle, a skirted cover therefor, the skirt of said cover having an offset hood with its sides tapering outwardly and having openings in the sides thereof near the bottom of the skirt, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off of the receptacle and to lie with the lower end of the long arm farthest from said axis.

4. A receptacle, a skirted cover therefor, said cover having a bead surrounding its lower edge, the skirt of said cover having an offset hood with its sides tapering outwardly and having openings in the sides thereof near the bottom of the skirt above the bead, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off of the receptacle and to lie with the lower end of the long arm farthest from said axis.

5. A receptacle, a skirted cover therefor, the skirt of said cover having an offset hood with its sides tapering outwardly and having openings in the sides thereof near the bottom of the skirt, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off of the receptacle and to lie with the lower end of the long arm farthest from said axis, the mouth or rim end of said receptacle having its edge unbroken and said cover having a gasket to engage said edge with sealing contact throughout.

6. A receptacle, a skirted cover therefor, said cover having a bead surrounding its lower edge, the skirt of said cover having an offset hood with its sides tapering outwardly and having openings in the sides thereof near the bottom of the skirt above the bead, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off the receptacle and to lie with the lower end of the long arm farthest from said axis, the mouth or rim end of said receptacle having its edge unbroken and said cover having a gasket to engage said edge with sealing contact throughout.

7. A receptacle, a skirted cover therefor, the skirt of said cover having an offset hood with its sides tapering outwardly and having openings in the sides thereof near the bottom of the skirt, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off of the receptacle and to lie with the lower end of the long arm farthest from said axis, and means to interlock said cover and said receptacle.

8. A receptacle, a skirted cover therefor, said cover having a bead surrounding its lower edge, the skirt of said cover having an offset hood with its sides tapering outwardly and having openings in the sides thereof near the bottom of the skirt above the bead, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off of the receptacle and to lie with the lower end of the long arm farthest from said axis, and means to interlock said cover and said receptacle.

9. A receptacle, a skirted cover therefor, the skirt of said cover having an offset hood with its sides tapering outwardly and having openings in the sides thereof near the bottom of the skirt, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off of the receptacle and to lie with the lower end of the long arm farthest from said axis, the mouth or rim end of said receptacle having its edge unbroken and said cover having a gasket to engage said edge with sealing contact throughout, and means to interlock said cover and said receptacle.

10. A receptacle, a skirted cover therefor, said cover having a bead surrounding its lower edge, the skirt of said cover having an offset hood with its sides tapering outwardly and having openings in the sides thereof near the bottom of the skirt above the bead, a bifurcated cover lifting lever having trunnions located in said openings, said lever having a short arm lying within said hood, and having a long arm extending below said skirt, said cover hood and said lever having provisions to cause said lever to lie at an inclination to the axis of the cover when the cover is off the receptacle and to lie with the lower end of the long arm farthest from said axis, the mouth or rim end of said receptacle having its edge unbroken and said cover having a gasket to engage said edge with sealing contact throughout, and means to interlock said cover and said receptacle.

11. A receptacle having a bead at its mouth forming an external shoulder, a cover having a skirt to fit over said bead, said skirt having a pair of adjacent bead engaging lugs and a second pair of widely spaced apart bead engaging lugs, said bead and said lugs constitute a snap-on interlocking means between said receptacle and its cover, and a cover lifting lever carried by the cover skirt and located between the lugs of the first mentioned pair.

12. A receptacle having a bead at its mouth forming an external shoulder, a cover having a skirt to fit over said bead, said skirt having a pair of adjacent bead engaging lugs, and a second pair of widely spaced apart bead engaging lugs, said bead and said lugs constitute a snap-on interlocking means between said receptacle and its cover, a cover lifting lever carried by the cover skirt and located between the lugs of the first mentioned pair, said cover and said lever having cooperating means automatically causing said lever to lie inclined outwardly from the axis of the cover when not on the receptacle and to lie substantially parallel and close to the wall of the receptacle when the cover is in place.

13. A receptacle having a bead at its mouth forming an external shoulder, a cover having a skirt to fit over said bead, said skirt having a pair of adjacent bead engaging lugs and a second pair of widely spaced apart bead engaging lugs, said bead and said lugs constitute a snap-on interlocking means between said receptacle and its cover, a cover lifting lever carried by the cover skirt and located between the lugs of the first mentioned pair, said lever comprising a substantially U-shaped wire member bent upon itself to constitute two resilient arms, the extremities of said arms being bent back upon themselves and having their ends bent laterally to form a pair of short arms and trunnions, said skirt having a pair of outwardly directed converging walls with elongated openings for receiving said trunnions, said skirt having means to hold said lever against becoming accidently detached from the cover.

14. A metallic receptacle having a beaded edge at its mouth forming a shoulder, a cover having a skirt with lugs to fit over and interlock with said shoulder, said skirt having a transverse slot and an outwardly offset hood above the slot, a cover lifter lever having a short arm and a long arm and having trunnions passed through said slot and having bearing therein, the short arm of said lever lying within the hood with its end in engagement with the side of the bead of said receptacle and the long arm projecting below the cover to lie against the receptacle when the same is covered.

15. A metallic receptacle having a beaded edge at its mouth forming a shoulder, a cover having a skirt with lugs to fit over and interlock with said shoulder, said skirt having a transverse slot and an outwardly offset hood above the slot, a cover lifter lever having a short arm and a long arm and having trunnions passed through said slot and having bearing therein, the short arm of said lever lying within the hood with its end in engagement with the side of the bead of said receptacle and the long arm projecting below the cover to lie against the receptacle when the same is covered, and means to cause said lever to move to and be retained in an outwardly inclined position when the cover is freed from the receptacle.

16. A sheet metal receptacle and a sheet metal flanged cover therefor, combined with a cover lifter lever mounted and fulcrumed on the flange of the cover to lie between the cover and the receptacle, and means carried on the cover whereby said lever is moved to and held in an outwardly inclined position with regard to the axis of the cover when the cover is off the receptacle.

17. A sheet metal receptacle and a sheet metal flanged cover therefor, combined with a cover lifter lever mounted and fulcrumed on the flange of the cover to lie between the cover and the receptacle, means whereby said lever is moved to and held in an outwardly inclined position with regard to the axis of the cover when the cover is off the receptacle, said lever having provisions by which it is moved in contact with the receptacle while placing the cover thereon, so as to lie closely adjacent the wall of the receptacle throughout the length of the lever.

18. A sheet metal receptacle and a sheet metal flanged cover therefor, combined with a cover lifter lever mounted and fulcrumed on the flange of the cover to lie between the cover and the receptacle, means whereby said lever is moved to and held in an outwardly inclined position with regard to the axis of the cover when the cover is off the receptacle, said means comprising resilient trunnion carrying elements and cam portions on the cover flange for turning the lever outwardly when free from the receptacle.

19. A sheet metal receptacle and sheet metal flanged cover therefor, combined with a cover lifter lever mounted and fulcrumed on the flange of the cover to lie between the cover and the receptacle, means whereby said lever is moved to and held in an outwardly inclined position with regard to the axis of the cover when the cover is off the receptacle, said means comprising resilient trunnion carrying elements and cam portions on the cover flange for turning the lever outwardly when free from the receptacle, said lever having trunnions by which it is moved in contact with the receptacle while placing the cover thereon, so as to lie closely adjacent the wall of the receptacle throughout the length of the lever.

20. A sheet metal receptacle and a sheet metal flanged cover therefor, combined with a cover lifter lever mounted and fulcrumed on the flange of the cover to lie between the cover and the receptacle, means whereby said lever is moved to and held in an outwardly inclined position with regard to the axis of the cover when the cover is off the receptacle, said receptacle having an annular shoulder and said cover having lugs to interlock with the same, there being one lug adjacent and at each side of said lifter and other lugs spaced approximately 120° from said lifter and from one another.

FRANK LEE DARLING.